No. 849,572. PATENTED APR. 9, 1907.
F. H. RICHARDS.
PROCESS OF MAKING PLAYING BALLS.
APPLICATION FILED JUNE 2, 1902.
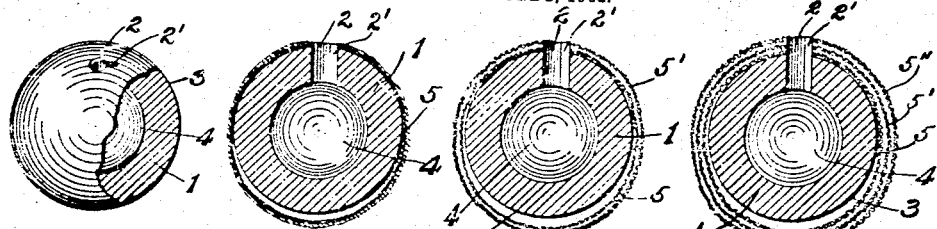
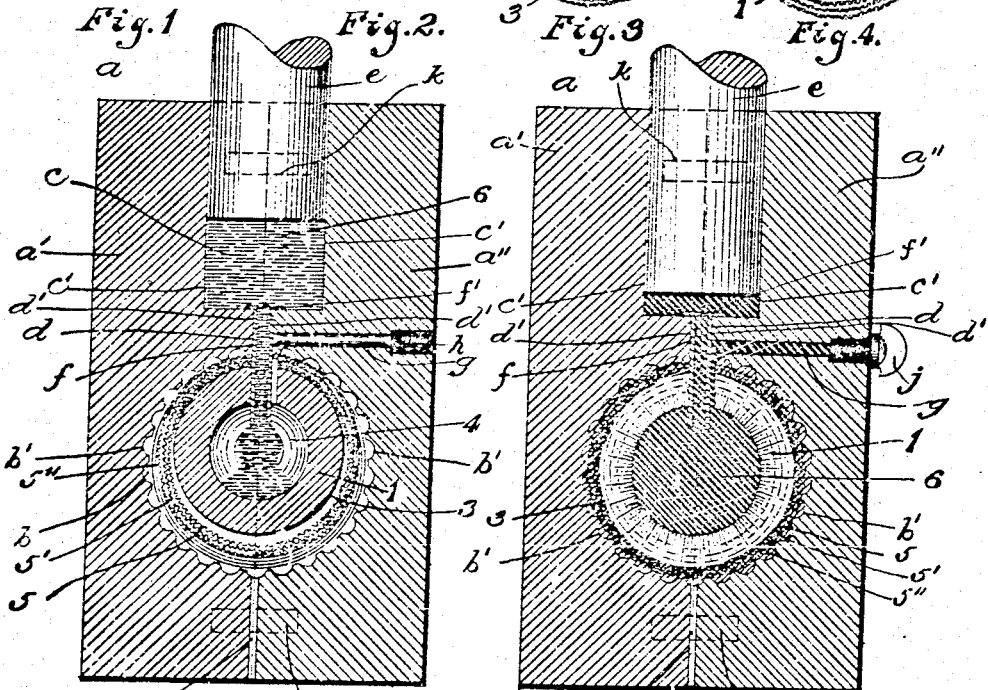
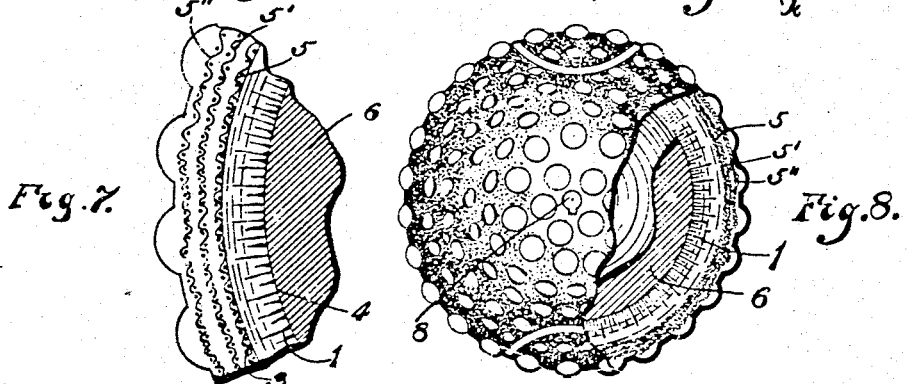
Witnesses:
James McConnell
E. Everett Ellis
Inventor:
F. H. Richards

UNITED STATES PATENT OFFICE.

FRANCIS H. RICHARDS, OF HARTFORD, CONNECTICUT.

PROCESS OF MAKING PLAYING-BALLS.

No. 849,572.      Specification of Letters Patent.      Patented April 9, 1907.

Application filed June 2, 1902. Serial No. 109,906.

*To all whom it may concern:*

Be it known that I, FRANCIS H. RICHARDS, a citizen of the United States, residing at Hartford, in the county of Hartford and State of Connecticut, have invented certain new and useful Improvements in Processes of Making Playing-Balls, of which the following is a specification.

This invention relates to the manufacture of playing-balls—such, for instance, as are employed in the game of golf; and it consists substantially in the improvements hereinafter particularly described.

The principal object of the invention is to provide a ball possessing durability and one also capable of withstanding all the rough usages to which the same may be subjected in golf and similar games.

The invention also has other objects in view, as will hereinafter fully appear when taken in connection with the accompanying drawings, wherein—

Figure 1 is a part sectional view representing an unexpanded soft-rubber shell preferably employed as the center piece or filler for my improved playing-ball. Fig. 2 is a sectional view representing the center piece or filler of Fig. 1, having applied thereto a layer of combined fabric and celluloid. Fig. 3 is a similar sectional view to Fig. 2, representing the employment of an additional layer of combined fabric and celluloid applied to the structure. Fig. 4 is also a similar view representing the addition of still another layer of combined fabric and celluloid. Figs. 5 and 6 are sectional views illustrating means employed in intermediate stages of the process of manufacture. Fig. 7 is an enlarged sectional view illustrating a fragment of the ball; and Fig. 8 is a part sectional view of a completed ball, partly broken away.

In proceeding to manufacture a ball in accordance with my present improved process I employ a spherical center piece or filler 1, preferably of soft rubber, in which I form a perforation 2, having in one side thereof a vent 2', the numeral 3 designating the outer surface of said center piece or filler and the numeral 4 the inner surface or cavity thereof. Upon the said outer surface of the said center piece or filler I apply a layer or shell 5 of suitable composite material, preferably of celluloid and fabric compounded together, and upon said layer or shell I apply a second layer or shell of the same composite material, as indicated at 5'. Preferably I also use a third layer or shell 5", as indicated at Fig. 4. Each layer of celluloid may be applied in a plastic condition and allowed to harden to an extent to permit safe handling, and the fabric layers may be applied separately, if desired. The several layers may, however, be applied in other ways coming within the scope of my invention, and it is desirable that all of the layers be loosely arranged.

The structure thus assembled I inclose in a mold $a$, consisting of two parts $a'$ and $a''$, having a pair of hemispherical depressions $b'$, which together form a spherical cavity or chamber $b$. The mold is also provided above the spherical chamber with a cylindrical bore $c$, formed by opposite recesses $c'$, one of the latter being in each half of the mold, and in said bore a piston $e$ is fitted, as indicated in Figs. 5 and 6. In a hole $d$, which is formed by opposite recesses $d'$ in the two parts of the mold, is inserted a funnel $f$, having a flange $f'$. The part $a''$ of the mold is provided with a transverse perforation $g$, the wall of which at the outer extremity is screw-threaded at $h$ to receive a threaded plug $j$. The two halves of the mold may be provided with dowels $k$, as indicated also in dotted lines in Figs. 5 and 6. The ball is placed in the mold thus organized so that the lower part of the funnel $f$ enters the ball through the perforation 2 thereof and is thus brought into communication with the interior cavity 4 of the center piece or filler 4. In the bore $c$, formed by the two parts of the mold, is placed a suitable quantity of gutta-percha or similar material 6, which is rendered fluent by heat, and this fluent material is forced into the interior of the ball, as indicated at Fig. 5, the air within the spherical cavity or chamber of the ball being displaced and forced out through the vents 2' and $g$ by distention of the ball structure, whereupon the plug $j$ may be inserted, as indicated at Fig. 6, and the piston forced down farther, so as to cause the gutta-percha to expand the rubber center piece or filler and its several enveloping layers to the full limits of the mold-chamber. A vent 7 may be provided for the escape of air from the chamber. The rubber center piece or filler of the ball is thus materially increased in diameter and placed in a state of tension, while the fabric and celluloid shells thereof, being rendered plastic by heat applied to the mold, are caused to conform to the shape of the mold-chamber, said chamber being preferably provided in its wall-surfaces with pits, such as are indicated in the drawings, so as to result in the formation of brambles on the outer surface of the shell or casing of the ball. Pressure is maintained upon the piston e until the entire ball cools and hardens, and after removal of the ball from the mold the perforation 2 2' may be filled up by a suitable plug, such as is indicated by the numeral 8 in Fig. 8.

It is apparent that I am not limited to the precise details of the several steps of my improved process for manufacturing playing-balls as herein set forth, since variations thereof may be resorted to within the scope of my invention.

Having described my invention, I claim—

1. A process of making a playing-ball consisting of placing a hollow body in a mold, distending such body by the injection of a mass and simultaneously imparting thereto an external configuration corresponding to the form of the mold.

2. A process of making a playing-ball consisting of placing a hollow body in a mold, distending the same by an injection of a mass thereinto while hot and simultaneously imparting thereto an external configuration corresponding to the form of the mold, and hardening the structure by cooling.

3. A process of making a playing-ball consisting in forcing into a hollow elastic body a substance rendered fluent by heat, and simultaneously imparting to the structure the desired form externally.

4. A process of making a playing-ball consisting in forcing into a hollow elastic body while hot a substance rendered fluent by heat, and simultaneously imparting the desired form to the structure externally.

5. A process of making a playing-ball consisting in forcing into a hollow elastic body while hot a substance rendered fluent by heat, and simultaneously imparting the desired form to the structure externally, and then hardening the structure by cooling.

6. A process of making a playing-ball consisting in forcing into a hollow elastic body while hot a substance rendered fluent by heat, and simultaneously imparting to the structure an externally-spherical form with a brambled surface, and hardening the structure by cooling.

7. A process of making a playing-ball consisting in forcing into a hollow body an elastic substance rendered fluent by heat and adapted to harden on cooling, and simultaneously imparting to the structure the desired form externally.

8. A process of making a playing-ball consisting in forcing into a hollow body while hot a substance rendered fluent by heat and adapted to harden on cooling, and simultaneously imparting to the structure the desired external form.

9. A process of making a playing-ball consisting in forcing into a hollow elastic body while hot a substance rendered fluent by heat, and simultaneously imparting to the structure the desired external form.

10. A process of making a playing-ball consisting in forcing into a hollow elastic body while hot a substance rendered fluent by heat, and simultaneously imparting the desired external form to the structure and cooling the structure.

11. A process of making a playing-ball consisting in forcing fluid gutta-percha into a hollow elastic body, and simultaneously imparting to the body the desired form externally.

12. A process of making a playing-ball consisting in forcing fluid gutta-percha into a hollow body while hot, and simultaneously imparting to the body the desired external form.

13. A process of making a playing-ball consisting in forcing fluid gutta-percha into a spherical elastic body while hot, and simultaneously imparting the desired shape to the structure externally.

14. A process of making a playing-ball consisting in applying an outer shell to a hollow sphere and forcing into the sphere a substance rendered fluent by heat and adapted to harden on cooling, and simultaneously imparting to the structure the desired external form.

15. A process of making a playing-ball consisting in applying a loosely-fitting outer shell to a hollow sphere and forcing into the sphere a substance rendered fluent by heat and adapted to harden on cooling, and simultaneously imparting to the structure the desired external form.

16. A process of making a playing-ball consisting in applying successive envelops to a hollow sphere and forcing into the sphere a substance rendered fluent by heat and adapted to harden on cooling, and simultaneously imparting to the structure the desired external form.

17. A process of making a playing-ball consisting in applying an outer shell to an elastic hollow sphere and forcing into the sphere a substance rendered fluent by heat and adapted to harden on cooling, and simultaneously imparting to the structure the desired external form.

18. A process of making a playing-ball consisting in applying an outer shell to a hollow sphere and forcing into the sphere under pressure, a substance rendered fluent by heat and adapted to harden on cooling, and simultaneously imparting to the structure the desired external form.

19. A process of making a playing-ball consisting in applying an outer shell to a hollow sphere and forcing into the sphere under pressure an elastic substance rendered fluent by heat and adapted to harden on cooling, and simultaneously imparting to the structure the desired external form.

20. A process of making a playing-ball consisting in simultaneously driving the air from the interior of a hollow body and forcing into the body a substance rendered fluent by heat and adapted to harden on cooling, and imparting to the structure the desired form externally.

21. A process of making a playing-ball consisting in compounding a sphere of fibrous material and celluloid and placing the structure under distention by injecting thereinto a mass rendered fluent or mobile by heat, and adapted to harden on cooling.

22. A process of making a playing-ball consisting in compounding a sphere of fibrous material and celluloid, and placing the structure under distention by injecting thereinto an elastic substance rendered fluent or mobile by heat, and adapted to harden on cooling.

23. A process of making a playing-ball consisting in compounding a sphere of fibrous material and celluloid and placing the structure under distention by injecting thereinto a mass of gutta-percha and allowing the mass to harden.

24. A process of making a playing-ball consisting in applying to an elastic hollow sphere a shell compounded of fibrous material and celluloid, and placing the structure under distention by forcing into the sphere an elastic substance rendered fluent by heat, and simultaneously imparting to the structure the desired external form.

25. A process of making a playing-ball consisting in applying to a hollow elastic sphere, a plurality of loosely-fitting envelops compounded of fibrous material and celluloid, and forcing into the sphere an elastic substance rendered fluent by heat, and simultaneously imparting to the structure the desired external form.

FRANCIS H. RICHARDS.

Witnesses:
B. C. STICKNEY,
E. EVERETT ELLIS.